US 8,488,588 B1

(12) United States Patent
Panwar et al.

(10) Patent No.: US 8,488,588 B1
(45) Date of Patent: Jul. 16, 2013

(54) METHODS AND APPARATUS FOR INDEXING SET BIT VALUES IN A LONG VECTOR ASSOCIATED WITH A SWITCH FABRIC

(75) Inventors: Ramesh Panwar, Pleasanton, CA (US); Jianhui Huang, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1234 days.

(21) Appl. No.: 12/347,418

(22) Filed: Dec. 31, 2008

(51) Int. Cl.
*H04L 12/28* (2006.01)
*H04J 3/24* (2006.01)

(52) U.S. Cl.
USPC .......................................... 370/351; 370/474

(58) Field of Classification Search
None
See application file for complete search history.

(56) References Cited

U.S. PATENT DOCUMENTS

| | | | |
|---|---|---|---|
| 4,215,402 A | 7/1980 | Mitchell et al. | |
| 5,473,607 A | 12/1995 | Hausman et al. | |
| 5,495,476 A | 2/1996 | Kumar | |
| 6,073,160 A | 6/2000 | Grantham et al. | |
| 6,157,955 A | 12/2000 | Narad et al. | |
| 6,212,184 B1 | 4/2001 | Venkatachary et al. | |
| 6,226,629 B1 | 5/2001 | Cossock | |
| 6,266,705 B1 | 7/2001 | Ullum et al. | |
| 6,457,058 B1 | 9/2002 | Ullum et al. | |
| 6,587,466 B1 | 7/2003 | Bhattacharya et al. | |
| 6,600,741 B1 | 7/2003 | Chrin et al. | |
| 6,600,744 B1 | 7/2003 | Carr et al. | |
| 6,618,397 B1 | 9/2003 | Huang | |
| 6,654,373 B1 | 11/2003 | Maher, III et al. | |
| 6,658,482 B1 | 12/2003 | Chen et al. | |
| 6,665,274 B1 | 12/2003 | Yamada | |
| 6,675,163 B1 | 1/2004 | Bass et al. | |
| 6,721,316 B1 | 4/2004 | Epps et al. | |
| 6,731,631 B1 | 5/2004 | Chang et al. | |
| 6,731,644 B1 | 5/2004 | Epps et al. | |
| 6,735,670 B1 | 5/2004 | Bronstein et al. | |
| 6,754,662 B1 | 6/2004 | Li | |
| 6,778,532 B1 | 8/2004 | Akahane et al. | |
| 6,778,546 B1 | 8/2004 | Epps et al. | |
| 6,778,984 B1 | 8/2004 | Lu et al. | |
| 6,789,118 B1 | 9/2004 | Rao | |
| 6,813,243 B1 | 11/2004 | Epps et al. | |
| 6,859,455 B1 | 2/2005 | Yazdani et al. | |

(Continued)

OTHER PUBLICATIONS

H. Jonathan Chao et al. "Matching Algorithms for Three-Stage Bufferless Clos Network Switches" IEEE Communications Magazine, Oct. 2003, pp. 46-54.

(Continued)

*Primary Examiner* — Clemence Han
(74) *Attorney, Agent, or Firm* — Cooley LLP (57) ABSTRACT

In one embodiment, an apparatus includes a loopback module configured to receive a first copy of a target vector during a clock cycle. The target vector can include a quantity of set bit values and can be defined based on a portion of data. The loopback module can be configured to define a loopback vector that has a quantity of set bit values that is less than a quantity of set bit values included in the first copy of the target vector. The apparatus also can include an index module configured to receive a second copy of the target vector during the clock cycle. The index module can be configured to define, during the clock cycle, an index vector based on the second copy of the target vector. The index vector can be configured to trigger an element associated with a switch fabric to process the data.

22 Claims, 7 Drawing Sheets

U.S. PATENT DOCUMENTS

| | | | |
|---|---|---|---|
| 6,862,278 | B1 | 3/2005 | Chang et al. |
| 6,889,225 | B2 | 5/2005 | Cheng et al. |
| 6,917,946 | B2 | 7/2005 | Corl, Jr. et al. |
| 6,925,085 | B1 | 8/2005 | Krishna et al. |
| 6,940,862 | B2 | 9/2005 | Goudreau |
| 6,947,931 | B1 | 9/2005 | Bass et al. |
| 6,977,930 | B1 | 12/2005 | Epps et al. |
| 7,042,878 | B2 | 5/2006 | Li |
| 7,089,240 | B2 | 8/2006 | Basso et al. |
| 7,133,400 | B1 | 11/2006 | Henderson et al. |
| 7,136,926 | B1 | 11/2006 | Iyer et al. |
| 7,173,931 | B2 | 2/2007 | Chao et al. |
| 7,190,696 | B1 | 3/2007 | Manur et al. |
| 7,193,997 | B2 | 3/2007 | Van Lunteren et al. |
| 7,227,842 | B1 | 6/2007 | Ji et al. |
| 7,233,568 | B2 | 6/2007 | Goodman et al. |
| 7,233,579 | B1 | 6/2007 | Crump et al. |
| 7,277,429 | B2 | 10/2007 | Norman et al. |
| 7,325,074 | B2 | 1/2008 | McRae |
| 7,349,415 | B2 | 3/2008 | Rangarajan et al. |
| 7,356,033 | B2 | 4/2008 | Basu et al. |
| 7,369,561 | B2 | 5/2008 | Wybenga et al. |
| 7,373,345 | B2 | 5/2008 | Carpentier et al. |
| 7,382,637 | B1 | 6/2008 | Rathnavelu et al. |
| 7,382,777 | B2 | 6/2008 | Irish et al. |
| 7,382,876 | B2 | 6/2008 | Lauter et al. |
| 7,383,244 | B2 | 6/2008 | Bass et al. |
| 7,394,809 | B2 | 7/2008 | Kumar et al. |
| 7,400,590 | B1 * | 7/2008 | Rygh et al. ............ 370/254 |
| 7,403,524 | B2 | 7/2008 | Hill |
| 7,403,526 | B1 | 7/2008 | Zou et al. |
| 7,418,505 | B2 | 8/2008 | Lim et al. |
| 7,441,268 | B2 | 10/2008 | Remedios |
| 7,480,302 | B2 | 1/2009 | Choi |
| 7,543,052 | B1 | 6/2009 | Cesa Klein |
| 7,602,787 | B2 | 10/2009 | Cheriton |
| 7,610,330 | B1 | 10/2009 | Quinn et al. |
| 7,646,771 | B2 | 1/2010 | Guru et al. |
| 7,668,160 | B2 | 2/2010 | Narayan et al. |
| 7,738,454 | B1 | 6/2010 | Panwar et al. |
| 2002/0138648 | A1 | 9/2002 | Liu |
| 2002/0146009 | A1 * | 10/2002 | Gupta et al. ............ 370/392 |
| 2002/0152209 | A1 | 10/2002 | Merugu et al. |
| 2002/0191605 | A1 | 12/2002 | Lunteren et al. |
| 2003/0023846 | A1 | 1/2003 | Krishna et al. |
| 2003/0030575 | A1 | 2/2003 | Frachtenberg et al. |
| 2003/0053460 | A1 | 3/2003 | Suda et al. |
| 2003/0059045 | A1 | 3/2003 | Ruehle |
| 2003/0156586 | A1 | 8/2003 | Lee et al. |
| 2003/0219017 | A1 | 11/2003 | Davis et al. |
| 2003/0223424 | A1 | 12/2003 | Anderson et al. |
| 2003/0233516 | A1 | 12/2003 | Davis et al. |
| 2004/0015599 | A1 | 1/2004 | Trinh et al. |
| 2004/0028046 | A1 | 2/2004 | Govindarajan et al. |
| 2004/0100950 | A1 | 5/2004 | Basu et al. |
| 2004/0100959 | A1 | 5/2004 | Relan |
| 2004/0190526 | A1 | 9/2004 | Kumar et al. |
| 2004/0254909 | A1 | 12/2004 | Testa |
| 2004/0258067 | A1 | 12/2004 | Irish et al. |
| 2004/0264373 | A1 | 12/2004 | Engbersen et al. |
| 2005/0083935 | A1 | 4/2005 | Kounavis et al. |
| 2005/0141510 | A1 | 6/2005 | Narsinh et al. |
| 2005/0226235 | A1 | 10/2005 | Kumar et al. |
| 2005/0232261 | A1 | 10/2005 | Wybenga et al. |
| 2005/0237938 | A1 | 10/2005 | Corl, Jr. et al. |
| 2006/0050690 | A1 | 3/2006 | Epps et al. |
| 2006/0083247 | A1 | 4/2006 | Mehta |
| 2006/0195896 | A1 | 8/2006 | Fulp et al. |
| 2006/0218167 | A1 | 9/2006 | Bosley et al. |
| 2006/0221954 | A1 | 10/2006 | Narayan et al. |
| 2006/0221956 | A1 | 10/2006 | Narayan et al. |
| 2006/0221967 | A1 | 10/2006 | Narayan et al. |
| 2007/0008962 | A1 | 1/2007 | Basu et al. |
| 2007/0070900 | A1 | 3/2007 | Heink et al. |
| 2007/0071233 | A1 | 3/2007 | Zak |
| 2007/0115986 | A1 | 5/2007 | Shankara |
| 2007/0133593 | A1 | 6/2007 | Shankara |
| 2007/0234005 | A1 | 10/2007 | Erlingsson et al. |
| 2007/0283045 | A1 | 12/2007 | Nguyen et al. |
| 2008/0137660 | A1 * | 6/2008 | Olakangil et al. ............ 370/392 |
| 2008/0177812 | A1 | 7/2008 | Brandle |
| 2008/0186974 | A1 | 8/2008 | Singh et al. |
| 2008/0228798 | A1 | 9/2008 | Van Lunteren |
| 2009/0196297 | A1 | 8/2009 | Jabr |
| 2010/0040067 | A1 | 2/2010 | Hao et al. |
| 2010/0080224 | A1 | 4/2010 | Panwar et al. |
| 2010/0083345 | A1 | 4/2010 | Panwar et al. |

OTHER PUBLICATIONS

Itamar Elhanany et al. "High-performance Packet Switching Architectures" Springer Science & Business Media, ISBN-10: 184628273X, 2002, Chapter 10, 20 pages.

Office Action mailed Feb. 17, 2010 for U.S. Appl. No. 12/242,168 (12 pages).

Office Action mailed Feb. 16, 2010 for U.S. Appl. No. 12/242,172 (11 pages).

Office Action mailed May 10, 2010 for U.S. Appl. No. 12/242,143 (23 pages).

Office Action mailed Apr. 23, 2010 for U.S. Appl. No. 12/347,495 (11 pages).

Office Action mailed Jun. 10, 2010 for U.S. Appl. No. 12/242,278, filed Sep. 30, 2008 (24 pages).

U.S. Appl. No. 12/242,143, filed Sep. 30, 2008, entitled "Methods and Apparatus for Compression in Packet Classification" (34 pgs).

U.S. Appl. No. 12/242,125, filed Sep. 30, 2008, entitled "Methods and Apparatus for Range Matching During Packet Classification Based on a Linked-Node Structure" (39 pgs).

U.S. Appl. No. 12/242,278, filed Sep. 30, 2008, entitled "Methods and Apparatus to Implement Except Condition During Data Packet Classification" (35 pgs).

U.S. Appl. No. 12/794,175, filed Jun. 4, 2010 entitled "Methods and Apparatus Related to Packet Classification Based on Range Values" (42 pgs).

U.S. Appl. No. 12/242,158, filed Sep. 30, 2008 entitled "Methods and Apparatus for Producing a Hash Value Based on a Hash Function" (37 pgs).

U.S. Appl. No. 12/347,495, filed Dec. 31, 2008 entitled "Methods and Apparatus for Packet Classification Based on Multiple Conditions" (40 pgs).

U.S. Appl. No. 12/347,499, filed Dec. 31, 2008 entitled "Methods and Apparatus for Packet Classification Based on Multiple Conditions" (41 pgs).

\* cited by examiner

METHODS AND APPARATUS FOR INDEXING
SET BIT VALUES IN A LONG VECTOR
ASSOCIATED WITH A SWITCH FABRIC

BACKGROUND

Embodiments described herein relate generally to processing set bit values within a vector, and, in particular, to indexing set bit values within a long vector associated with a switch fabric within a network.

Known algorithms can take a relatively long period of time (e.g., many clock cycles) to index a set bit value in a vector. Indexing the set bit value can include, for example, searching for the set bit value, identifying the set bit value, and/or defining an index vector based on the set bit value. If multiple bit values are included in the vector and/or if the vector has a relatively long bitwise length (e.g., a bitwise length greater than 16 bits), the indexing time of these known algorithms can be increased (e.g., significantly increased). These known algorithms, although relatively inefficient, may be sufficient when used in some microprocessor applications. In high speed processing systems, however, where efficiently indexing set bit values within a relatively long vector is desirable, these known algorithms may not be adequate. For example, if indexing set bit values related to data packets during packet classification for a switch fabric is too slow, forwarding of the packets through the switch fabric based on the packet classification can be delayed in an undesirable fashion. As a result, the switch fabric can become congested and some of the packets may even be lost.

Thus, a need exists for methods and apparatus for indexing set bit values within a relatively long vector to address the shortfalls of existing set bit value indexing techniques.

SUMMARY

In one embodiment, an apparatus includes a loopback module configured to receive a first copy of a target vector during a clock cycle. The target vector can include a quantity of set bit values and can be defined based on a portion of data. The loopback module can be configured to define a loopback vector that has a quantity of set bit values that is less than a quantity of set bit values included in the first copy of the target vector. The apparatus also can include an index module configured to receive a second copy of the target vector during the clock cycle. The index module can be configured to define, during the clock cycle, an index vector based on the second copy of the target vector. The index vector can be configured to trigger an element associated with a switch fabric to process the data.

DETAILED DESCRIPTION

A find-first-set (FFS) module can be configured to define one or more index vectors based on a combination of bit values within an input vector. In some embodiments, processing related to defining one or more index values can be referred to as indexing. Specifically, the FFS module can be configured to define an index vector for each set bit value within the input vector. The FFS module can be configured to define each of the index vectors based on the set bit values from the input vector during mutually exclusive clock cycles of a clock signal. The FFS module can also be configured to define each of the index vectors based on an iterative algorithm during, for example, consecutive clock cycles. The iterative algorithm can include, for example, defining a loopback vector during each consecutive clock cycle associated with processing of the input vector. In some embodiments, the input vector can be a relatively long vector with, for example, hundreds or thousands of bit values.

In some embodiments, the FFS module can be included in a classification pipeline of an access switch (e.g., a gateway device) within a data center. In some embodiments, the input vector can be a policy vector (e.g., a facet cover vector) defined by a classification module within the classification pipeline based on, for example, one or more fields from data (e.g., a data packet) received from a host device (e.g., a server device) at the access switch. The set bit values within the policy vector can each be an indicator that a condition (e.g., a policy condition associated routing within the data center) has been satisfied. Index vectors defined by the FFS module based on the policy vector can be used by, for example, a processing module (e.g., an action module) within the classification pipeline to retrieve an instruction. The instruction can be used by, for example, the processing module to process the data within the data center. In other words, the set bit values can each be associated with one or more instructions that can be executed when an associated condition has been satisfied. In some embodiments, the set bit values within the policy vector can be ordered so that one or more instructions with which the set bit values are associated can be executed in a desired execution order (e.g., execution priority). In other words, the order of the set bit values can correspond with a desired execution order of a set of instructions. Moreover, the set bit values (or each of the bit locations) within the policy vector can be associated with an execution priority value.

In some embodiments, a vector, such as the index vector, can be a binary string defined by, for example, a sequence of high values (represented as 1's) and/or low values (represented as 0's). The values in the binary string can be referred to as bit values. In other words, the vector can define a sequence of bit values. In some embodiments, for example, if an FFS module is implemented in a hardware system that is a base-n system (e.g., a base-4 system), a vector processed by the packet classification module can be a base-n string. In some embodiments, the vector can be defined as a one-dimensional array. In some embodiments, for example, if an FFS module is implemented in software, a vector processed by the FFS module can be a string that includes a sequence of symbols (e.g., American Standard Code for Information Interchange (ASCII) characters) and/or digits. For example, the vector can be a byte string or a hexadecimal value.

Figure 1:
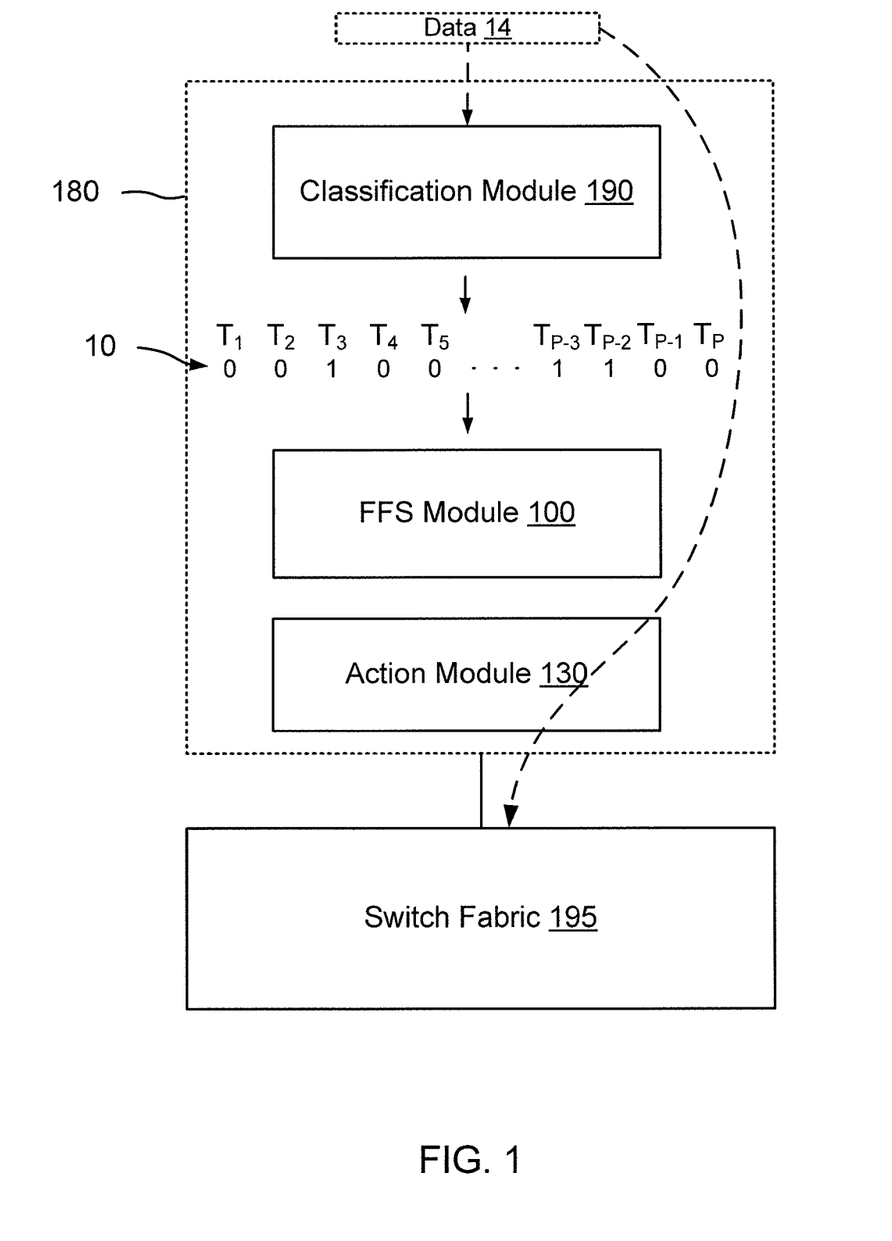
FIG. 1 is a schematic diagram that illustrates a portion of a classification pipeline and a switch fabric, according to an embodiment.

FIG. 1 is a schematic diagram that illustrates FIG. 1 is a schematic diagram that illustrates a classification pipeline 180 and a switch fabric 195, according to an embodiment. Specifically, FIG. 1 illustrates a find-first-set (FFS) module 100 included in the classification pipeline 180 and configured to define an index vector based on a policy vector 10, according to an embodiment. The policy vector 10 includes bit values at specified vector locations $T_1$ through $T_P$ within the policy vector 10 that represent whether or not one or more policy conditions have been satisfied. In other words, each of the vector locations $T_1$ through $T_P$ shown in policy vector 10 are associated with at least one policy condition. A set bit value at a vector location within the policy vector 10 represents that at least one policy condition has been satisfied. The FFS module 100 is configured to define an index vector that can be used by the action module 130 to retrieve an instruction associated with the satisfied policy condition so that the data 14 can be processed based on the instruction. In this embodiment, the action module 130 is configured to route the data 14 via a switch fabric 195 based on the satisfied policy condition. The policy vector 10 can be defined by a classification module 190 based on one or more portions (e.g., a field, a payload, an address portion, a port portion) of the data 14. In some embodiments, the data 14 can be, for example, an Internet Protocol (IP) packet, a session control protocol packet, a media packet, and so forth.

As shown in FIG. 1, the vector location $T_{P-2}$, vector location $T_{P-3}$, and vector location $T_3$ within the policy vector 10 each include set bit values (i.e., a high value or "1"). In this embodiment, the most significant bit value is at vector location $T_1$ and the least significant bit value is at vector location $T_P$. Although not shown, in some embodiments, a policy vector can include vector locations (and bit values within those vector locations) that are not associated with policy conditions. In some embodiments, a set bit value can be represented by, for example, a "0" (or a different logical equivalent).

In this embodiment, the FFS module 100 is configured to define an index vector for each of the set bit values within the policy vector 10 during contiguous (e.g., consecutive, coterminous) clock cycles of a clock signal. In this embodiment, the FFS module 100 is configured to define an index vector for each of the set bit values starting with the least significant set bit value (the right-most set bit value) at vector location $T_{P-2}$. For example, FFS module 100 is configured to define a first index vector for the set bit value at vector location $T_{P-2}$ during a first clock cycle and then define a second index vector for the set bit value at vector location $T_{P-3}$ during a second clock cycle that is directly after the first clock cycle. In other words, the first clock cycle and the second clock cycle are coterminous or share a common clock cycle boundary. In some embodiments, the clock signal can be defined by a clock signal generator (not shown). More details related to a clock cycle of a clock signal and the timing of processing at an FFS module are set forth in connection with FIG. 3.

In some embodiments, the FFS module 100 can be configured to define an index vector for each of the set bit values starting with a different set bit value than the least significant set bit value at vector location $T_{P-2}$. For example, the FFS module 100 can be configured to define an index vector for each of the set bit values starting with the most significant set bit value at vector location $T_3$.

In some embodiments, the FFS module 100 can be configured to define an index vector for each of the set bit values within the policy vector 10 in any combination of consecutive clock cycles and/or non-consecutive clock cycles. For example, the FFS module 100 can be configured to define a first index vector for the set bit value at vector location $T_{P-2}$ during a first clock cycle and then define a second index vector for the set bit value at vector location $T_{P-3}$ during a second clock cycle. One or more clock cycles can be included in a time period between the first clock cycle and the second clock cycle. In some embodiments, the FFS module 100 can be configured to perform, during the time period between the first clock cycle and the second clock cycle, one or more functions related to defining the second index vector. In some embodiments, the FFS module 100 can be configured to define a third index vector for the set bit value at vector location $T_3$ during a third clock cycle that is directly after the second clock cycle. In other words, the second clock cycle and the third clock cycle can be contiguous.

In some embodiments, the FFS module 100 can be configured to define an index vector for a subset of the set bit values within the policy vector 10. For example, in some embodiments, the FFS module 100 can be configured to define an index vector for the set bit value at vector location $T_{P-1}$ and the set bit value at vector location $T_3$, but not for the set bit value at vector location $T_{P-3}$. In some embodiments, the subset of the set bit values for which index vectors are defined can be determined based on an index policy that can be accessed by the FFS module 100. For example, in some embodiments, the FFS module 100 can be configured to define index vectors associated with set bit values at specified vector locations within the policy vector 10 based on an index policy.

In some embodiments, index vectors defined by the FFS module 100 can represent the vector location of the set bit value within the policy vector 10. For example, if the policy vector 10 is a vector that has a bitwise length of 16 bits (e.g., P=16), a 4-bit index vector representing the set bit value at vector location $T_{P-2}$ (third set bit value from the right) would be 0011, and a 4-bit index vector representing the set bit value at vector location $T_{P-3}$ (fourth set bit value from the right) would be 0100. In some embodiments, the index vector can be used to retrieve an instruction from a memory (not shown). For example, the index vector can represent an address value associated with a location of an instruction within a memory.

The index vectors defined by the FFS module 100 can be sent to the action module 130 and used by the action module 130 to retrieve an instruction (e.g., a descriptor associated with an instruction). The instruction can be executed by and/or triggered by the action module 130. For example, an index vector can be used to look-up an instruction within a memory (not shown) such as a table within the memory that can be accessed by the action module 130. In some embodiments, the index vector can be manipulated (e.g., rotated) and/or combined with other bit values (e.g., other vectors, offset vectors) so that an instruction can be retrieved by the action module 130. In some embodiments, the action module 130 can be referred to as an element that is associated with the switch fabric 195, and as an element configured to process the data 14 based on the instruction. Although not shown, in some embodiments, one or more processing modules (e.g., routing engines) outside of and/or included within a stage of the switch fabric 195 can also be elements configured to process the data 14 based on the instruction.

For example, the index vector can be modified so that the index vector represents a location within a memory (not shown) where an instruction can be stored. In some embodiments, the instruction can be an action descriptor associated with more than one operation that can be performed by and/or triggered by the action module 130. In some embodiments, the action module 130 can be referred to as a processing module or as a packet processing module. More details related to an action module are discussed in connection with co-pending patent application bearing 12/347,495, filed same date, entitled "Methods and Apparatus for Packet Classification based on Multiple Conditions" and co-pending patent application bearing 12/347,499, filed same date, entitled "Methods and Apparatus for Packet Classification based on Multiple Conditions," both of which are incorporated herein by reference in their entireties.

As shown in FIG. 1, the classification module 190, the FFS module 100, and the action module 130 can be included in the classification pipeline 180. The classification pipeline 180 can be configured to perform processing so that data (e.g., data 14) can be, for example, included in (e.g., put into the format of) one or more cells (e.g., variable size cells, fixed-size cells) that can be transmitted within the switch fabric 195 based on a policy. More details related to classification of data at a classification pipeline are set forth in co-pending patent application Ser. No. 12/242,172, filed on Sep. 30, 2008, entitled "Methods and Apparatus for Packet Classification based on Policy Vectors," and co-pending patent application Ser. No. 12/242,168, filed on Sep. 30, 2008, entitled "Methods and Apparatus related to Packet Classification associated with a Multi-Stage Switch," both of which are incorporated herein by reference in their entireties.

In some embodiments, the classification pipeline 180 can be included in, for example, a network device (not shown) configured to function as a gateway (e.g., an access switch) between the switch fabric 195 and other devices (not shown) such as a host device (or a virtual resource within a host device). The switch fabric 195 and the other devices can be configured to handle data based on different protocols. For example, the other devices can be configured to communicate based on an Ethernet protocol, and the switch fabric 195 can be a cell-based fabric where one or more portions of data (e.g., portions of data 14, portions of data packets) are transmitted via the switch fabric 195 having been reformatted into one or more cells (e.g., variable size cells, fixed size cells). In other words, the network device can provide the other devices configured to communicate via one protocol with access to the switch fabric 195, which can be configured to communicate via another protocol. In some embodiments, network device can be configured to function as a router, a network hub device, and/or a network bridge device.

In some embodiments, the network device, the switch fabric 195, and/or the other devices can be component(s) within a network or interconnection of devices that define a data center. In some embodiments, the data center can have a core portion defined by, for example, the switch fabric 195. In some embodiments, the network device, the other devices, and/or modules that define the switch fabric 195 can be included in one or more chassis (not shown). For example, the network device can be a top-of-rack (TOR) device for a chassis, and the host device can be a blade server within the chassis.

The switch fabric 195 can be a multi-stage switch fabric (e.g., 3-stage switch fabric, 5-stage switch fabric). For example, although not shown, the switch fabric 195 can include an ingress stage, a middle stage, and an egress stage. In some embodiments, the switch fabric 195 can be a reconfigurable (e.g., a rearrangeable) switch fabric and/or a time-division multiplexed switch fabric. In some embodiments, switch fabric 195 can be defined based on a Clos network architecture (e.g., a strict sense non-blocking Clos network, a Benes network) and the switch fabric 195 can include a data plane and a control plane.

In some embodiments, one or more portions of the FFS module 100 can be a hardware-based module (e.g., a combinational logic module, a digital signal processor (DSP), a field programmable gate array (FPGA)) and/or a software-based module (e.g., a module of computer code, a set of processor-readable instructions that can be executed at a processor). In some embodiments, one or more of the functions associated with the FFS module 100 can be included in different modules (not shown) and/or combined into one or more modules (e.g., included in the action module 130).

Figure 2:
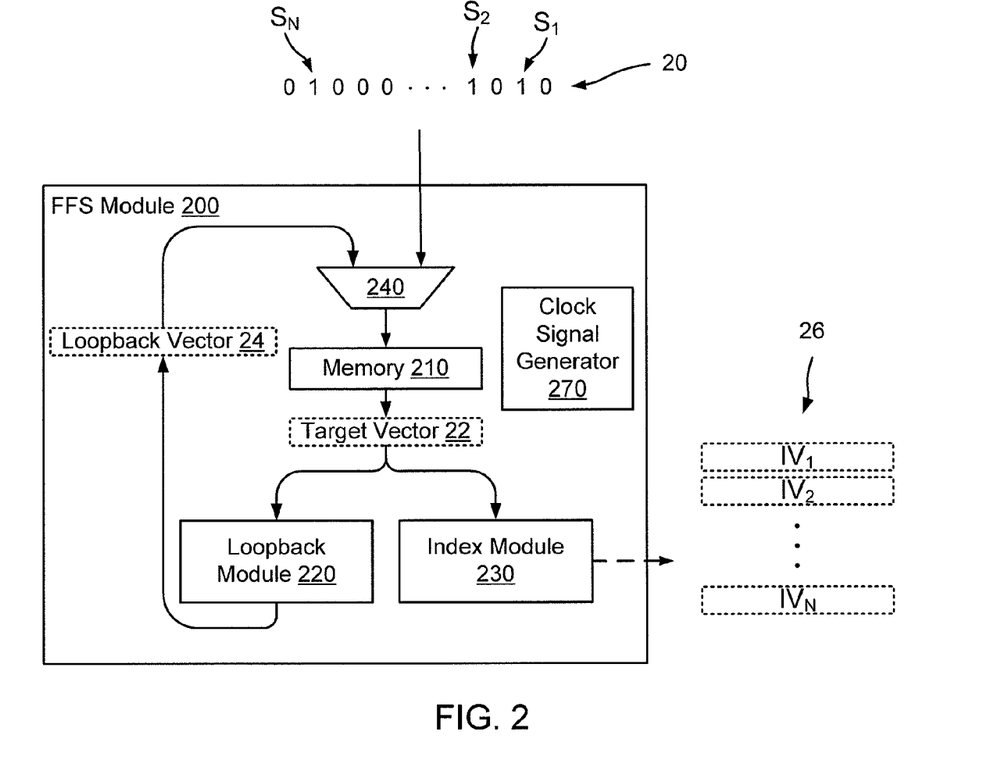
FIG. 2 is a schematic block diagram that illustrates an FFS module configured to define a set of index vectors based on an input vector, according to an embodiment.

FIG. 2 is a schematic block diagram that illustrates an FFS module 200 configured to define a set of index vectors 26 based on an input vector 20, according to an embodiment. The input vector 20 includes set bit value $S_1$ through set bit value $S_N$. In some embodiments, the input vector 20 can be, for example, a policy vector previously defined by a classification module or an instruction vector configured to trigger execution of an operation. The index vectors 26 (also can be referred to as a set of index vectors 26) include index vector $IV_1$ through index vector $IV_N$. Each of the index vectors 26 is associated with (e.g., represents) one of the set bit values $S_1$ through $S_N$ within the input vector 20. In some embodiments, each of the index vectors 26 is associated with only one of the set bit values $S_1$ through $S_N$ within the input vector 20. In this embodiment, index vectors (from the set of index vectors 26) and set bit values (from input vector 20) with a common index value are associated with one another. For example, index vector $IV_2$ (with an index value of 2) can represent set bit value $S_2$ (with an index value of 2).

The FFS module 200 is configured to define each of the index vectors 26 during mutually exclusive clock cycles of a clock signal defined by a clock signal generator 270. The FFS module 200 is also configured to define each of the index vectors 26 in a serial fashion (e.g., sequential fashion) during consecutive clock cycles based on the set bit values from input vector 20. Thus, the index vectors $IV_1$ through $IV_N$ associated with the input vector 20 are defined during N contiguous clock cycles of the clock signal defined by the clock signal generator 270. In particular, each of the index vectors 26 is defined during a processing iteration performed by the FFS module 200 within a clock cycle. For example, index vector $IV_1$ is defined based on set bit value $S_1$ during a first processing iteration (within a first clock cycle), index vector $IV_1$ is defined based on set bit value $S_2$ during a second processing iteration (within a second clock cycle after the first clock cycle), and index vector $IV_N$ is defined based on set bit value $S_N$ during the $N^{th}$ processing iteration (within an $N^{th}$ clock cycle). In some embodiments, the $N^{th}$ processing iteration can be referred to as the last processing iteration for the input vector 20.

In addition to the clock signal generator 270, the FFS module 200 includes a memory 210, a loopback module 220, an index module 230, and a vector selection module 240. As shown in FIG. 2, the loopback module 220 and the index module 230 are configured to process a target vector 22 in parallel. The loopback module 220 and the index module 230 are configured to receive the target vector 22 (e.g., instances or copies of the target vector 22) from the memory 210 at the beginning of a clock cycle (e.g., a rising edge of a first clock cycle, a falling edge of a first clock cycle) during a processing iteration.

The target vector 22 includes a least significant set bit value (the right-most set bit value within the target vector 22) that can be referred to as a target set bit value. The target set bit value can be referred to as a target because an index vector is being defined for the target set bit value during the current processing iteration. The target set bit value can be at a target vector location within the target vector 22. Any set bit value from the target vector 22 for which an index vector is being defined during a given processing iteration can be referred to as the target set bit value.

The target vector 22 corresponds with either the input vector 20 or the loopback vector 24 depending on whether the input vector 20 or the loopback vector 24 is selected by the vector selection module 240 for storage in the memory 210 and processing during a processing iteration. In some embodiments, the vector selection module 240 can be, for example, a multiplexer (can be referred to as a mux).

The set bit values of the target vector 22 (starting with the input vector 20) are sequentially changed to non-set bit values (also can be referred to as being inverted) during each processing iteration so that the least significant set bit value of the target vector 22 during each processing iteration will be a target set bit value for which an index vector has not yet been defined. The process of changing the set bit values to non-set bit values during successive processing iterations can be referred to as stripping the set bit values, or as stripping the target set bit values. Changing a set bit value to a non-set bit value can be referred to as inverting the set bit value.

In this embodiment, the loopback vector 24 will have a different sequence of bit values during each processing iteration until an index vector for each of the set bit values included in the input vector 20 has been defined. Specifically, the target vector 22 has one less set bit value during a processing iteration than the target vector 22 during a prior processing iteration because at least one of the set bit values is inverted. The loopback vector 24 during the processing iteration, however, will have a length (e.g., a bitwise length) that is the same as a length of the loopback vector 24 during the prior processing iteration.

In this embodiment, the input vector 20 is selected by the vector selection module 240 for storage in the memory 210 so that the target vector 22 corresponds with the input vector 20 during the first processing iteration of the first clock cycle associated with the input vector 20. Accordingly, during the first processing iteration of the first clock cycle, the target set bit value within the target vector 22 is set bit value $S_1$ (from the input vector 20) and the index module 230 is configured to define the first index vector $IV_1$ based on the first set bit value $S_1$ (least significant set bit value). In parallel with the processing performed by the index module 230, the loopback module 220 is configured to strip out (or invert) the first set bit value $S_1$ to define a loopback vector 24. In other words, during the first processing iteration, the loopback vector 24 defined by the loopback module 220 includes all of the bit values (set bit values and non-set bit values) included in the input vector 20 except for the set bit value $S_1$, which is changed to a non-set bit value.

At the end of the first processing iteration, the loopback vector 24 defined during the first processing iteration can be selected by the vector selection module 240 stored in the memory 210 for processing during the second processing iteration as the target vector 22. The loopback vector 24, and the target vector 22, which corresponds with the loopback vector 24, will have the set bit value $S_2$ as a least significant set bit value and as the new target set bit value. The target vector 22 can be processed by the index module 230 during the second processing iteration to define index vector $IV_2$. In this embodiment, the vector selection module 240 is configured to select the loopback vector 24, rather than the input vector 20 (or a new input vector), for storage in the memory 210 and for parallel processing via the loopback module 220 and index module 230 during successive processing iterations of successive clock cycles until the index vectors 26 (which each represent a set bit value from the input vector 20) have been defined for all of the set bit values included in the input vector 20. In other words, the vector selection module 240 is configured to select the loopback vector 24 until processing of each of the set bit values included in the input vector 20 as a target set bit value has been completed. In sum, during a processing iteration, the index module 230 is configured to define one of the index vectors 26 based on the target set bit value while the loopback module 220 is configured to (in parallel with the processing performed at the index module 230) invert the target set bit value in preparation for processing during the next processing iteration.

Iterative processing of the target vector 22, which changes with each clock cycle, continues until the index vector $IV_N$ has been defined based on the final target bit value $S_N$ (as shown in input vector 20). After the index vector $IV_N$ has been defined, the vector selection module 240 can be configured to select a new input vector (not shown). In other words, after the index vectors 26 have been defined based on the set bit values included in the input vector 20, the FFS module 200 can be configured to receive the new input vector.

In some embodiments, the loopback module 220 and/or the index module 230 can be hardware-based modules that are defined based on (e.g., include) combinational logic. In some embodiments, the combinational logic can also be referred to a flat logic. Because the loopback module 220 and/or the index module 230 can be configured to process the target vector 22 based on combinational logic, the processing latency of the loopback module 220 and/or the index module 230 can be a relatively short duration compared with a duration of a clock cycle of the clock signal defined by the clock signal generator 270.

Figure 3:
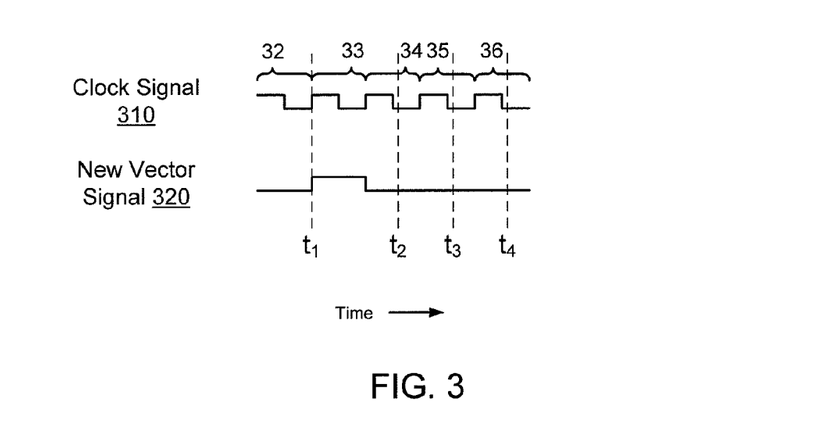
FIG. 3 is a timing diagram related to defining of index vectors at an FFS module, according to an embodiment.

FIG. 3 is a timing diagram related to defining index vectors at an FFS module, according to an embodiment. As shown in FIG. 3, time increases to the right. At time $t_1$, a new vector signal 320 is changed from a low value (e.g., a low state) to a high value (e.g., a high state) to trigger, for example, a vector selection module to select a new input vector for storage in a memory within an FFS module (such as FFS module shown in FIG. 1 or 2).

As shown in FIG. 3, the new vector signal 320 is asserted (e.g., a high value) during clock cycle 33 of a clock signal 310 defined by, for example, a clock signal generator (e.g., clock signal generator shown in FIG. 1 or 2). The new vector signal 320 can be changed from the low value to the high value in response to a new input vector being received at the FFS module and in response to processing of a previous input vector at the FFS module being completed.

During clock cycle 34 of the clock signal 310, the new input vector can be released from the memory as a target vector. Also, during clock cycle 34 of the clock signal 310, the target vector (which corresponds to the new input vector) can be processed at an index module and at a loopback vector module (such as the index module and the loopback vector module shown in FIG. 1).

At time $t_2$, an index vector is defined based on a target set bit value included in the target vector. Also during the clock cycle 34, a loopback vector is defined by the loopback vector module and is selected for storage in the memory because the new vector signal 320 is a low value (not asserted). The loopback vector can have bit values that correspond with the target vector except that the target set bit value can be inverted (e.g., changed from a set bit value to a non-set bit value).

At times $t_3$ and $t_4$ shown in FIG. 3, index vectors are defined based on additional set bit values included in the new input vector. The FFS module can be configured to continue processing of the new input vector until an index vector has been defined for each set bit value within the new input vector, for example, that is associated with a policy condition.

Figure 4:
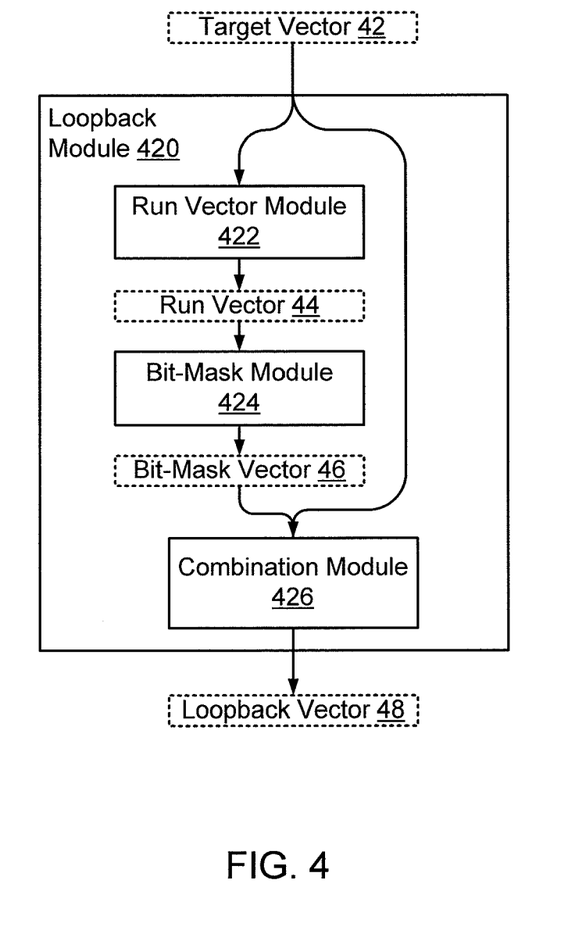
FIG. 4 is a schematic block diagram that illustrates a loopback module configured to define a loopback vector based on a target vector, according to an embodiment.

FIG. 4 is a schematic block diagram that illustrates a loopback module 420 configured to define a loopback vector 48 based on a target vector 42, according to an embodiment. The loopback module 420 be included in an FFS module (not shown) and can be configured to process the target vector 42 in parallel with an index module (not shown) included in the FFS module. In some embodiments, the target vector 42 can be received at the loopback module 420 from a memory (not shown) included in an FFS module. In some embodiments, the target vector 42 can be received from the memory in response to a clock signal.

The target vector 42 can have one or more set bit values that are associated with, for example, a policy condition. The target vector 42 can correspond with an input vector or can correspond with a loopback vector that has been defined based on the input vector. The loopback vector 48 can be defined at the loopback module 420 based on the target vector 42 during a single clock cycle. The loopback vector 48 includes all of the set bit values and non-set bit values included in the target vector 42 except for a target set bit value, which is changed from a set bit value to a non-set bit value. In this embodiment, the target set bit value is the least significant set bit value within the target vector 42. A vector location of the target set bit value can be referred to as a target vector location.

As shown in FIG. 4, the loopback module 420 includes a run vector module 422, a bit-mask module 424, and a combination module 426. The run vector module 422 is configured to define a run vector 44 based on the target vector 42. All of the vector locations within the run vector 44 include set bit values except for the bit values in vector locations to the right of the target bit value.

The bit-mask module 424 is configured to define a bit-mask vector 46 based on the run vector 44. The combination module 426 is configured to define the loopback vector 48 based on a combination of the bit-mask vector 46 and the target vector 42. The bit-mask vector 46 is a bit-mask that can be combined with the target vector 42 to produce the loopback vector 48. The bit-mask vector 46 includes only a set bit value at a vector location of the target bit value (i.e., the target vector location). Specifically the bit-mask vector 46 can be combined with the target vector 42 so that the target set bit value within the target vector 42 can be inverted to produce the loopback vector 48.

For example, the target vector 48 can be the 14-bit value "00100110011000." The target bit vector within the target vector 48 is underlined to identify the target vector location. The target set bit value in the target vector 48 is the $4^{th}$ set bit value from the right, which is the least significant set bit value.

Based on the target vector 48, the run vector 44 with the bit values "11111111111000" can be defined. The target bit vector within the run vector 44 is underlined to identify the target vector location. As shown, all of the vector locations within the run vector 44 include set bit values except for the bit values in vector locations to the right of the target bit value. The run vector 44 can be defined based on combinational logic that can be hierarchically-related logical modules. More details related to hierarchically-related logical modules that can be used to define a run vector based on a target vector are described in connection with FIGS. 6 and 7.

Based on the run vector 44, the bit-mask vector 46 with the following bit values "00000000001000" can be defined. The bit-mask vector 46 includes a set bit value at only the target vector location. The target bit vector within the bit-mask vector 46 is underlined to identify the target vector location.

In some embodiments, the bit-mask vector 46 can be defined based on a combination of the run vector 44 with an inverted and shifted version of the run vector 44. For example, the bit-mask vector 46 can be defined based on the following equation: bit-mask_vector[i]=~run_vector[i−1] & run_vector[i], where the index "i" represents a bit vector location.

The combination module 426 is configured to define the loopback vector 48 based on a combination of the bit-mask vector 46 and the target vector 42. The bit-mask vector 46 is a bit-mask that can be combined with the target vector 42 to produce the loopback vector 48. The bit-mask vector 46 includes only a set bit value at a vector location of the target bit value (i.e., the target vector location). In this embodiment, the loopback vector 48 with the bit values "00100110010000" can be defined based on a combination of the run vector 44 and the bit-mask vector 46. As shown in the loopback vector 48 bit sequence, all of the bit values within the loopback vector 48 correspond with the bit values included in the target vector 42 except for the bit value at the target vector location. The bit value at the target vector location within the loopback vector 48, which is underlined, is a non-set bit value.

Figure 5:
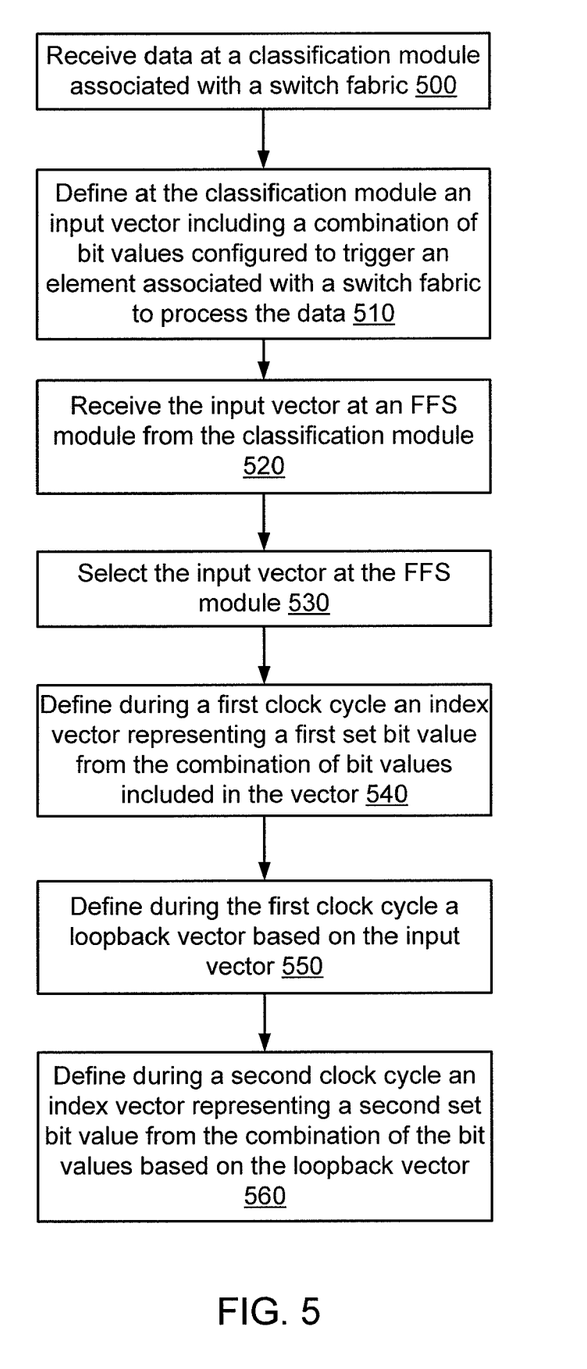
FIG. 5 is a flowchart that illustrates a method for defining a loopback vector and an index vector, according to an embodiment.

FIG. 5 is a flowchart that illustrates a method for defining a loopback vector and an index vector, according to an embodiment. As shown in FIG. 5, data is received at a classification module associated with a switch fabric, at 500. In some embodiments, the switch fabric can define at least a portion of a core of a data center. Accordingly, the classification module can be configured to classify the data so that the data can be routed, for example, via the switch fabric. The data can be included in one or more cells (e.g., variable size cells, fixed-size cells) that can be transmitted via the switch fabric. In some embodiments, the data can be received at the classification module from, for example, a host device such as a server device configured to host one or more virtual resources. The classification module can be included in a gateway device, such as an access switch, disposed between the host device and the switch fabric.

An input vector including a combination of bit values configured to trigger an element (e.g., an action module, a portion of a packet classification pipeline, a processing module within a stage of the switch fabric) associated with the switch fabric to process the data is defined at the classification module, at 510. The input vector can be defined by the classification module based on a classification algorithm. In some embodiments, the input vector can be referred to as a policy vector.

The input vector is received at an FFS module from the classification module, at 520. The FFS module can be included in a gateway device, such as an access switch, disposed between a host device and the switch fabric. In some embodiments, the FFS module can be a hardware-based module that includes combinational logic.

The input vector is selected at the FFS module, at 530. The input vector can be selected by, for example, a vector selection module after processing of another input vector has been completed at the FFS module.

During a first clock cycle an index vector representing a first set bit value from the combination of bit values included in the input vector is defined, at 540. In some embodiments, the index vector representing the first set bit value can represent a vector location of the first set bit value within the input vector. The vector location can be associated with a policy condition and/or an instruction associated with processing at the switch fabric. Accordingly, the first set bit value can be associated with a policy condition. In some embodiments, the first set bit value can represent that the policy condition has been satisfied. In some embodiments, the index vector can be defined by an index module. In some embodiments, the first set bit value from the combination of bit values can be referred to as a target set bit value.

During the first clock cycle, a loopback vector is defined based on the input vector, at 550. In some embodiments, the loopback vector can be defined by a loopback module. In some embodiments, the loopback module can include hierarchically-related combinational logic modules. In some embodiments, the loopback vector can be defined based on logical combination of a bit-mask vector and the input vector. Specifically, the loopback vector includes all of the bit values from the input vector except for the first set bit value, which is inverted based on the logical combination of the bit-mask vector and the input vector. In some embodiments, the loopback vector can be defined in parallel with the index vector.

During a second clock cycle, an index vector representing a second set bit value from the combination of the bit values is defined based on the loopback vector, at 560. In some embodiments, the index vector representing the second set bit value can represent a vector location of the first set bit value within the input vector. The second clock cycle can be directly after the first clock cycle within a clock signal. In other words, the first clock cycle and the second clock cycle can be coterminous and/or can share a common clock cycle boundary. In some embodiments, the first clock cycle and the second clock cycle can be defined by a clock signal generator. In some embodiments, the loopback vector can be selected for processing at the FFS module by a vector selection module. Blocks 530 through 560 can be repeated until an index vector has been defined for each set bit value included in the input vector.

Figure 6:
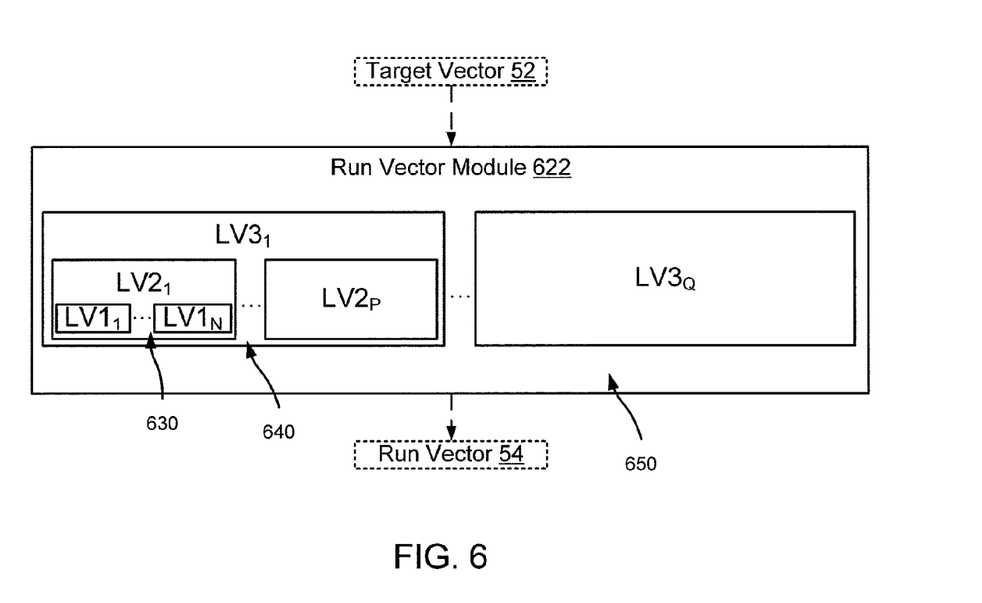
FIG. 6 is a schematic block diagram that illustrates a run vector module, according to an embodiment.
Figure 7A:
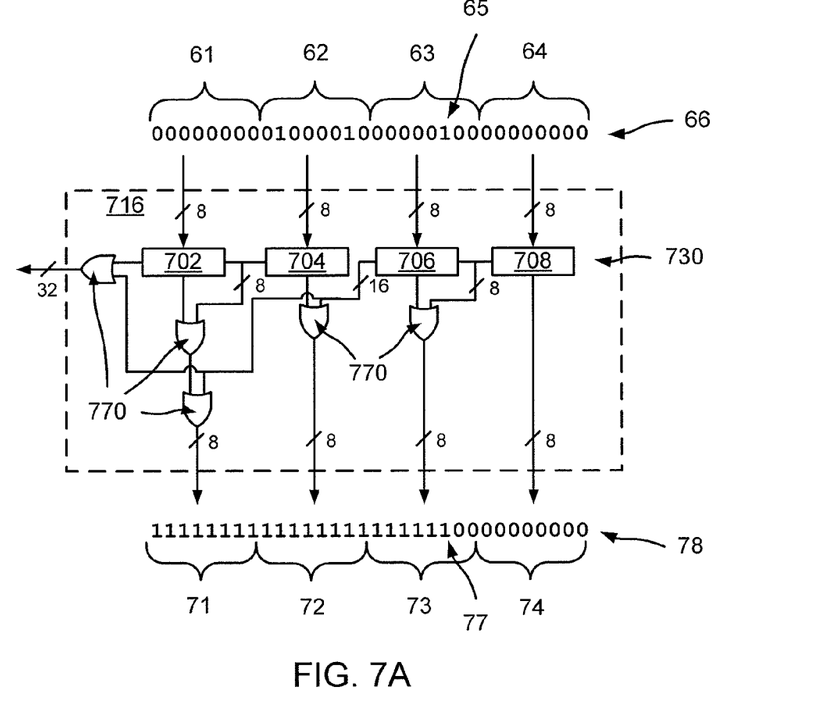
FIGS. 7A and 7B are a schematic diagrams that illustrate hierarchically-related logical modules that can be used to define a run vector based on a target vector, according to an embodiment.

FIG. 6 is a schematic block diagram that illustrates a run vector module 622, according to an embodiment. The run vector module 622 can be configured to define a run vector 54 based on a target vector 52. The target vector 52 can correspond with an input vector or can correspond with a loopback vector that has been defined based on the input vector. In some embodiments, the run vector 54 can have a bitwise length that is the same as a bitwise length of the target vector 52. In some embodiments, the run vector module 622 can include logic configured to, for example, change (e.g., truncate, expand) the run vector 54 so that the bitwise length of the run vector 52 is different than the bitwise length of the target vector 52. In some embodiments, the run vector module 622 can be included in a loopback module such as that shown in FIG. 4 and/or an FFS module such as those shown in FIGS. 1 and 2.

As shown in FIG. 6, the run vector module 622 is configured to define the run vector 54 based on hierarchically-related logical modules. Specifically, a first level of logical modules $LV1_1$ through $LV1_N$ (can collectively be referred to as first level logical modules 630) are included in one of a second level of logical modules $LV2_1$ through $LV2_P$ (can collectively be referred to as second level logical modules 640). Specifically, the first level logical modules 630 are included in at least the second level logical module $LV2_1$. Each of first level of logical modules 630 can be referred to as being serially related to one another, and can be referred to as being hierarchically related to the second level of logical modules 640. Although not shown, each of the second level logical modules 640 can include a first level of logical modules similar to the first level logical modules 630 included in second level logical module $LV2_1$.

A third level logical module $LV3_1$ from a third level of logical modules $LV3_1$ through $LV3_Q$ (can collectively be referred to as third level logical modules 650) includes the second level of logical modules 640. Although not shown, each of the third level logical modules 650 can include a second level of logical modules similar to the second level logical modules 640 included in third level logical module $LV3_1$.

Each of the individual logical modules can be configured to define a run vector of a specified bitwise length based on a target vector having the same bitwise length. When several of the individual logical modules are logically combined in a serial fashion and/or a hierarchical fashion, the combined logical modules can be used to define a run vector that has a different length than each of the individual logical modules. For example, the logical module $LV1_1$ can be configured to define a run vector that has a first bitwise length, but the serially-related logical modules 630 can be configured to define a run vector that has a second bitwise length that is longer than the first bitwise length.

The individual logical modules shown in FIG. 6 can be combined in different serial and/or hierarchical configurations to handle processing of target vectors of different lengths. For example, an FFS module (such as those shown in FIGS. 1 and 2) can be configured to define index vectors based on set bit values within an input vector that has a bitwise length of 1024 bits. In this case, the individual logical modules shown in FIG. 6 can be combined in a specified serial and/or hierarchical configuration to handle processing related to 1024-bit input vectors. If the FFS module were configured to process input vectors having a different bitwise length than 1024 bits, the individual logical modules shown in FIG. 6 can be combined in a different configuration to handle processing of the input vector with the different bitwise length. In some embodiments, the configuration can be hardware and/or software configuration that can be defined before operation (based on expected bitwise vector lengths) and/or changed dynamically during operation (e.g., between input vectors of different lengths).

Figure 7B:
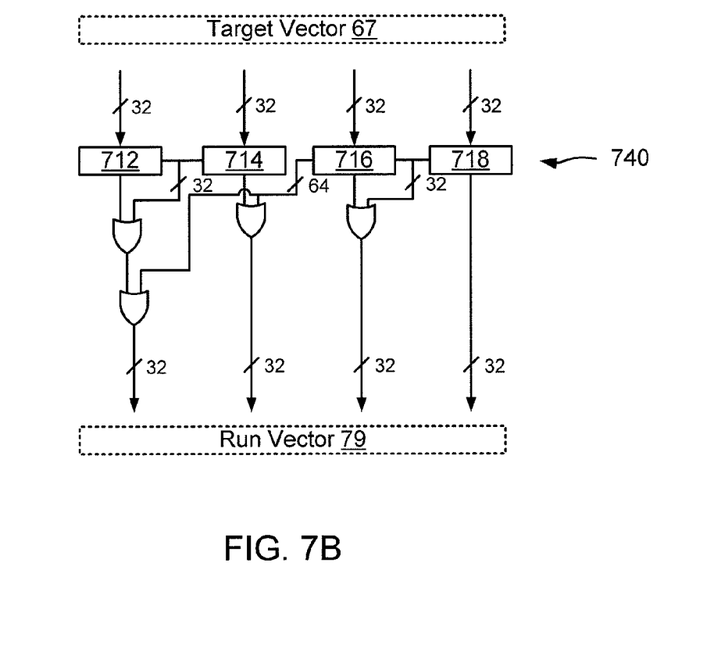

FIGS. 7A and 7B are a schematic diagrams that illustrate hierarchically-related logical modules that can be used to define a run vector 79 (shown in FIG. 7B, but not shown in FIG. 7A) based on a target vector 67 (shown in FIG. 7B, but not shown in FIG. 7A), according to an embodiment. Specifically, FIG. 7A illustrates a logical module 716 that is one of a series of logical modules 740 (third one from the left) shown in FIG. 7B. FIG. 7A includes a series of logical modules 730 included in the logical module 716. Accordingly, the series of logical modules 730 (shown in FIG. 7A) are hierarchically related to the series of logical modules 740 (shown in FIG. 7B). The series of logical modules 730 includes logical module 708, logical module 706, logical module 704, and logical module 702, which are serially-related logical modules. In this embodiment, the target vector 67 has a bitwise length of 128-bits, and the run vector 79 has a bitwise length of 128-bits.

As shown in FIG. 7A, each of logical modules from the series of logical modules 730 is configured to process an 8-bit segment of a vector 66 that is a portion of the target vector 67 (shown in FIG. 7B). The vector 66 can be referred to as a target vector portion. The target vector portion 66 has four segments—segment 61, segment 62, segment 63, and segment 64. As shown in FIG. 7A, the target vector portion 66 includes a least significant set bit value 65 in segment 63. In some embodiments, the least significant set bit value 65 can be referred to as a target bit value.

The logical module 716 is configured to define a vector 78 that is a portion of the run vector 79 (shown in FIG. 7B). The vector 78 can be referred to as a run vector portion. As shown in FIG. 7A, the run vector portion 78 includes a set bit value 77 that corresponds with the least significant set bit value 65 included in the target vector portion 66. The run vector portion 78 has four segments—segment 71, segment 72, segment 73, and segment 74—that are associated with the four segments of the target vector portion 66. For example, segment 71 in the run vector portion 78 is defined based on segment 61 of the target vector portion 66.

In this embodiment, the logical module 716 is configured to process the target vector portion 66 so that all of the bit values to the left of the set bit 77 in the run vector portion 78 are set bit values and all of the bit values to the right of the set bit 77 in the run vector portion 78 are non-set bit values. Specifically, each logical module from the series of logical module 730 is configured to define all bits to the left of a set bit value included in a segment as set bit values. The outputs of the logical modules 730 are combined using logical or-gate combinations 770 as shown in FIG. 7A to produce the segments of the run vector portion 78. For example, the segment 74 of the run vector portion 78 defined by logical module 708 includes only non-set bit values (e.g., zeros) because the segment 64 of the target vector portion 66 (input into logical module 708) does not include any set bit values. The segment 73 of the run vector portion 78, which is a logical "or" combination of an 8-bit vector (not shown) defined by logical module 706 and the 8-bit segment defined by logical module 708, has set bit values to the left of the set-bit value 77 (which corresponds with set bit value 65) and non-set bit values to the right of set-bit value 77.

Figure 8:
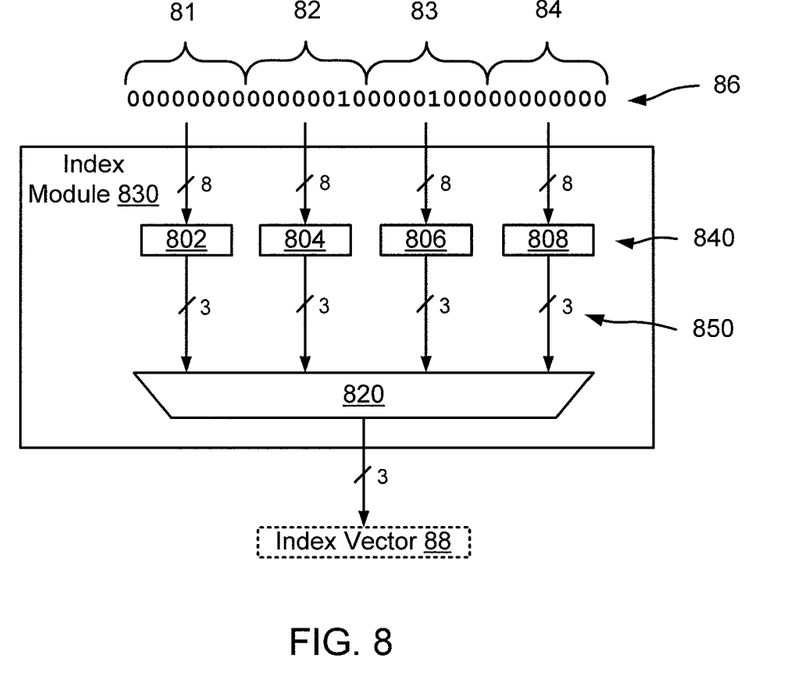
FIG. 8 is a schematic diagram that illustrates an index module, according to an embodiment.

FIG. 8 is a schematic diagram that illustrates an index module 830, according to an embodiment. The index module 830 is configured to define an index vector 88 based on an input vector 86 that has four segments—segment 81, segment 82, segment 83, and segment 84. In this embodiments, the index vector 88 is a 3-bit vector that is selected by priority mux 820 from a set of 3-bit index vectors 850 defined by a series of index blocks 840 based on a priority policy. Specifically, the priority mux 820 can have combinational logic defined based on the priority policy.

The series of index blocks 840 include index block 802, index block 804, index block 806, and index block 808. The index block 808 is configured to define a 3-bit index vector (that is included in the set of index vectors 850) based on segment 84, the index block 806 is configured to define a 3-bit index vector (that is included in the set of index vectors 850) based on segment 83, and so forth. For example, the index block 808 is configured to define a 3-bit index vector "000" based on segment 84, which represents that no set bit value is included in segment 84. The index block 804 is configured to define a 3-bit index vector "010" based on segment 82, which represents a vector location of the set bit value within segment 82.

In this embodiment, the priority mux 820 can be configured to process the set of 3-bit index vectors 850 so that a non-zero 3-bit index vector that is defined based on the right-most segment (e.g., the least significant segment) from the input vector 86 is selected as the index vector 88. Said differently, the priority mux 820 is configured to process the set of 3-bit index vectors 850 so that the index vector 88 is equal to a non-zero 3-bit index vector that is produced by the right-most index block from the series of index blocks 840. In this embodiment, the first (starting from the right) non-zero 3-bit index vector "100" (which represents a vector location of the set bit value within segment 83) is defined based on segment 83 by index block 806. Accordingly, the 3-bit vector defined by block 806 can be selected by the priority mux 820 as the index vector 88. Although the index block 804 is configured to also produce a non-zero 3-bit index vector "010", the non-zero 3-bit index vector defined by index block 804 is defined based on segment 82, which is to the left of segment 83.

In some embodiments, the index vector 88 can be, for example, modified after being defined by the index module 830 shown in FIG. 8. For example, a bit vector (not shown) can be combined with (e.g., logically combined with, concatenated with) the index vector 88. In some embodiments, the index vector 88 can be modified so that the modified index vector 88 can be used to retrieve an instruction. One or more portions of data can be processed by a module associated with, for example, a switch fabric based on the instruction.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, an access switch functioning as a gateway between a host device and a switch fabric can have multiple FFS modules configured to process multiple input vectors in parallel. In some embodiments, an FFS modules can be configured to define index vectors starting with a most significant set bit value included in an input vector.

What is claimed is:

1. An apparatus comprising:
a loopback module configured to receive a first copy of a target vector during a clock cycle, the target vector including a quantity of set bit values and being defined based on a portion of data to be transmitted via a switch fabric, the loopback module configured to define a loopback vector that has a quantity of set bit values less than a quantity of set bit values included in the first copy of the target vector; and an index module configured to receive a second copy of the target vector during the clock cycle, the index module configured to define during the clock cycle an index vector based on the second copy of the target vector, the index vector being configured to trigger an element associated with the switch fabric to process the data.

2. The apparatus of claim 1, wherein the index module is configured to define a plurality of index vectors based on the second copy of the target vector, the index vector is selected from the plurality of index vectors based on a priority policy.

3. The apparatus of claim 1, wherein the quantity of set bit values included in the loopback vector is one less than the quantity of set bit values included in the first copy of the target vector.

4. The apparatus of claim 1, wherein target vector includes a target bit value at a target vector location, the loopback vector excludes the target bit value at a vector location corresponding to the target vector location.

5. The apparatus of claim 1, wherein the loopback vector is a first loopback vector, the clock cycle is a first clock cycle, the loopback module is configured to define a second loopback vector based on the first loopback vector during a second clock cycle after the first clock cycle, the second clock cycle and the first clock cycle being coterminous.

6. The apparatus of claim 1, wherein the loopback vector is a first loopback vector, the clock cycle is a first clock cycle, the quantity of set bit values included in the first copy of the target vector correspond with a quantity of set bit values included in a second loopback vector defined by the loopback module during a second clock cycle before the first clock cycle, the second clock cycle and the first clock cycle being coterminous.

7. The apparatus of claim 1, further comprising:
a packet classification module configured to define the quantity of set bit values of the target vector based on the data and based on at least one filter condition.

8. The apparatus of claim 1, wherein the loopback vector is defined based on a set of hierarchically-related logical units included in the loopback module.

9. A method, comprising:
receiving an input vector including a combination of bit values;
defining during a first clock cycle an index vector representing a first set bit value from the combination of the bit values included in the input vector;
defining during the first clock cycle a loopback vector based on the input vector; and
defining during a second clock cycle an index vector representing a second set bit value from the combination of the bit values based on the loopback vector, the first clock cycle and the second clock cycle being coterminous.

10. The method of claim 9, wherein the index vector represents a location of the first set bit value within the input vector.

11. The method of claim 9, further comprising:
retrieving a routing instruction based on the index vector associated with the first set bit value, the routing instruction being configured to trigger processing of data at a switch fabric such that the data can be at least partially routed through the switch fabric.

12. The method of claim 9, wherein the first set bit value is at a target vector location, the loopback vector includes a combination of bit values that excludes the first set bit value at a vector location corresponding to the target vector location.

13. The method of claim 9, wherein the loopback vector is a first loopback vector, the clock cycle boundary is a clock cycle boundary on a first side of the second clock cycle,
the method further comprising:
defining a second loopback vector during the second clock cycle; and
defining during a third clock cycle an index vector representing a third set bit value from the combination of the bit values based on the second loopback vector, the third clock cycle and the second clock cycle having a common clock cycle boundary on a second side of the second clock cycle.

14. The method of claim 9, wherein the input vector is a first input vector,
the method further comprising:
determining that the second set bit value is a last set bit value;
selecting a second input vector in response to the determining; and
defining during a third clock cycle an index vector representing a set bit value from a combination of bit values included in the second input vector, the third clock cycle and the second clock cycle having a common clock cycle boundary.

15. The method of claim 9, wherein the first set bit value is a least significant set bit value.

16. A method, comprising:
defining, based on a target vector, a run vector that has a continuous run of identical bit values, the continuous run of identical bit values including a set bit value at a target vector location, the target vector location being associated with a policy condition;
defining a bit-mask vector that includes a portion of the continuous run of identical bit values; and
defining a loopback vector based on a combination of the bit-mask vector with the target vector such that the loopback vector includes a non-set bit value at a vector location that corresponds with the target vector location of the run vector.

17. The method of claim 16, further comprising:
defining an index vector based on the loopback vector, the index vector being associated with an instruction related to processing of data to be transmitted via a switch fabric.

18. The method of claim 16, wherein the portion of the continuous run of identical bit values includes the set bit value.

19. The method of claim 16, wherein the defining the run vector, the defining the bit-mask vector, and the defining of the loopback vector are performed during a single clock cycle.

20. The method of claim 16, wherein the defining associated with the run vector is performed during a first clock cycle, the target vector corresponds with a second loopback vector defined during a second clock cycle before the first clock cycle, the first clock cycle and the second clock cycle being coterminous.

21. The method of claim 16, wherein the policy condition is associated with processing of data for transmission over a switch fabric.

22. The method of claim 16, wherein the combination is based on an exclusive-or operation.

* * * * *